(12) United States Patent
Nakashima et al.

(10) Patent No.: US 9,784,507 B2
(45) Date of Patent: Oct. 10, 2017

(54) OUTDOOR COOLING UNIT FOR VEHICULAR AIR CONDITIONING APPARATUS

(71) Applicant: Mitsubishi Electric Corporation, Chiyoda-ku (JP)

(72) Inventors: Seiji Nakashima, Chiyoda-ku (JP); Kenichi Sakoda, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 119 days.

(21) Appl. No.: 14/765,501

(22) PCT Filed: Dec. 10, 2013

(86) PCT No.: PCT/JP2013/083026
§ 371 (c)(1),
(2) Date: Aug. 3, 2015

(87) PCT Pub. No.: WO2014/125710
PCT Pub. Date: Aug. 21, 2014

(65) Prior Publication Data
US 2015/0369546 A1    Dec. 24, 2015

(30) Foreign Application Priority Data

Feb. 12, 2013   (JP) .................................. 2013-024559

(51) Int. Cl.
*F28F 13/06* (2006.01)
*F24F 1/38* (2011.01)
(Continued)

(52) U.S. Cl.
CPC ......... *F28F 13/06* (2013.01); *B60H 1/00371* (2013.01); *B60H 1/3229* (2013.01);
(Continued)

(58) Field of Classification Search
CPC ........ F24F 1/38; F24F 1/48; F24F 1/50; F28F 13/06; F04D 29/384; F04D 29/667;
(Continued)

(56) References Cited

U.S. PATENT DOCUMENTS 2,176,325 A * 10/1939 Bretzlaff ............... F04D 25/166
165/125
3,714,795 A *  2/1973 Fowell ...................... F24F 1/10
62/181
(Continued)

FOREIGN PATENT DOCUMENTS

JP        03-13272 U1    2/1991
JP        06-229398 A    8/1994
(Continued)

OTHER PUBLICATIONS

Office Action issued Mar. 29, 2016 in Japanese Patent Application No. 2015-500103 (with English language translation).
(Continued)

*Primary Examiner* — Tho V Duong
(74) *Attorney, Agent, or Firm* — Oblon, McClelland, Maier & Neustadt, L.L.P.

(57) ABSTRACT

An outdoor cooling unit for vehicular air conditioning apparatus includes: a casing including an outlet section, inlet sections having an inlet plane inclined; a first heat exchanger facing one of the inlet sections and a second heat exchanger facing an other of the inlet sections; at least one propeller fan below the outlet section to blow out air upwardly. An angle formed between the normal line to the inlet plane and the z axis is an acute angle. Each of the blades includes a blade chord center point on an inner peripheral end thereof and an other blade chord center point on an outer peripheral end thereof, positioned so that a line segment connecting therebetween has an inclination to the outlet section proportionally to closeness to outer periphery of the blade. A blade
(Continued)

chord center line forms a curve being convex toward the outlet section across the entire area.

11 Claims, 6 Drawing Sheets

(51) Int. Cl.
    *F24F 1/48*     (2011.01)
    *F04D 29/38*     (2006.01)
    *F04D 29/66*     (2006.01)
    *B60H 1/00*     (2006.01)
    *B60H 1/32*     (2006.01)

(52) U.S. Cl.
    CPC .......... *F04D 29/384* (2013.01); *F04D 29/663* (2013.01); *F04D 29/667* (2013.01); *F24F 1/38* (2013.01); *F24F 1/48* (2013.01); *B60H 2001/00235* (2013.01)

(58) Field of Classification Search
    CPC . F04D 29/663; F04D 29/544; B60H 1/00371; B60H 1/3229; B60H 2001/00235
    See application file for complete search history.

(56) References Cited

U.S. PATENT DOCUMENTS

| | | | | |
|---|---|---|---|---|
| 4,307,778 | A * | 12/1981 | Tobin | F24F 1/18 165/125 |
| 7,533,716 | B2 * | 5/2009 | Bianco | F28F 9/0265 165/122 |
| 2004/0131465 | A1 * | 7/2004 | Ochiai | F01D 9/026 415/206 |
| 2004/0136830 | A1 * | 7/2004 | Eguchi | F04D 29/384 416/228 |
| 2009/0193831 | A1 * | 8/2009 | Kim | F04D 29/526 62/259.1 |
| 2009/0255654 | A1 * | 10/2009 | Zheng | F04D 29/162 165/122 |
| 2011/0192186 | A1 * | 8/2011 | Kato | F04D 29/162 62/324.3 |
| 2014/0246180 | A1 | | 9/2014 | Nakashima et al. |

FOREIGN PATENT DOCUMENTS

| | | |
|---|---|---|
| JP | 6-239228 A | 8/1994 |
| JP | 3071973 B2 | 7/2000 |
| JP | 2003-48536 A | 2/2003 |
| JP | 2004-11423 A | 1/2004 |
| JP | 2006-273099 A | 10/2006 |
| JP | 2011-85106 A | 4/2011 |
| WO | WO 2011/141964 A1 | 11/2011 |

OTHER PUBLICATIONS

Combined Office Action and Search Report issued on Jun. 3, 2016 in Chinese Patent Application No. 201380072779.1 with partial English translation and English translation of category of cited documents.

International Search Report issued Mar. 4, 2014, in PCT/JP2013/083026, filed Dec. 10, 2013.

European Search Report dated Nov. 2, 2016 in European Patent Application No. 13875134.2.

* cited by examiner

OUTDOOR COOLING UNIT FOR VEHICULAR AIR CONDITIONING APPARATUS

TECHNICAL FIELD

The present invention relates to an outdoor cooling unit for vehicular air conditioning apparatus.

BACKGROUND ART

There are conventionally known techniques for reducing noise of outdoor cooling unit for vehicular air conditioning apparatus. For example, "a vehicular heat exchange module which includes a fan unit disposed at the downstream side of a heat exchanger which is formed in a rectangular shape, the fan unit including a shroud having a bell-mouth and an annular opening, a propeller fan disposed in the annular opening, and a fan motor that rotates the propeller fan, wherein the fan unit is a unit having a single-fan configuration in which fan motor input power is not greater than a predetermined level, and the propeller fan is provided with two sets of winglets that are mounted to extend in a radius direction with a specific gap therebetween in a circumferential direction on both a pressure surface and a negative pressure surface at a proximal end of a blade" has been proposed (for example, see Patent Literature 1).

The vehicular heat exchange module described in Patent Literature 1 having the above configuration can prevent deviation of air flow and disturbance of flow caused by the deviated air flow being turned in the radius direction by the centrifugal force, thereby preventing deterioration of aerodynamic performance and increase of noise.

Further, there are techniques known for reducing noise of propeller fan. For example, "an axial flow fan having a plurality of blades disposed on the outer periphery of a cylindrical boss, wherein the blade has a cross section taken along a plane which extends in a radius direction from a rotation center through a proximal end of the blade that is in contact with the boss has a shape which curves in any position toward the outer periphery with the outer periphery being oriented to an air flow direction and having a horizontal angle which gradually increases toward the outer periphery, and the blade is a forward-swept wing with a forward swept angle formed by a straight line extending between the rotation center and the middle point of the proximal end of the blade and a straight line extending between the rotation center and the middle point of the outer peripheral edge of the blade being in the range of 20 to 40 degrees" has been proposed (for example, see Patent Literature 2).

The propeller fan described in Patent Literature 2 having the above configuration can further reduce air flow noise.

CITATION LIST

Patent Literature

Patent Literature 1: Japanese Unexamined Patent Application Publication No. 2011-85106 (summary, FIG. 2)
Patent Literature 2: Japanese Patent No. 3071973 (claim 1, FIGS. 1 to 4)

SUMMARY OF INVENTION

Technical Problem

Conventionally, there is an outdoor cooling unit for vehicular air conditioning apparatus which includes a casing having an outlet section formed on a top surface and inlet sections formed on both sides of the outlet section with an inlet plane being inclined downward from the outlet section to the outside (inclined against a base by having a distance to the base decreasing from the outlet section to the outside), a pair of heat exchangers each of which is disposed to face the inlet section, a propeller fan having a boss that rotates about an axis and a plurality of blades disposed on the outer periphery of the boss and disposed in the casing under the outlet section so as to blow air in an upward direction, and a motor that rotates the propeller fan.

In the outdoor cooling unit for vehicular air conditioning apparatus having the above a configuration, an angle formed by a normal line of the inlet plane and an axis of the propeller fan (in other words, normal line of a base which is a lower surface of the casing) is an arcuate angle. That is, in the outdoor cooling unit for vehicular air conditioning apparatus having the above a configuration, an air flow in the casing from the heat exchanger to the propeller fan is in a substantially V-shape in a transverse sectional view, which causes a large amount of curving of air flow which flows from the heat exchanger until to be suctioned into the propeller fan. As a consequence, the outdoor cooling unit for vehicular air conditioning apparatus having the above a configuration has a problem of increased noise due to a large flow resistance of air which flows in the casing and unstable blade edge vortex generated at the outer peripheral end of the blade.

Although the vehicular heat exchange module described in Patent Literature 1 is effective in reducing disturbance of air flow of the propeller fan, it does not consider reducing flow resistance by reducing the amount of curving of air flow from the heat exchanger to the propeller fan and stabilizing blade edge vortex. As a result, using the technique of Patent Literature 1 in the outdoor cooling unit for vehicular air conditioning apparatus does not provide sufficient noise reduction compared with the conventional technique.

Further, although the propeller fan described in Patent Literature 2 is effective in reducing a disturbance of air flow, it does not consider reducing flow resistance by reducing the amount of curving of air flow from the heat exchanger to the propeller fan and stabilizing blade edge vortex. As a result, employing the technique of Patent Literature 2 in the outdoor cooling unit for vehicular air conditioning apparatus does not provide sufficient noise reduction compared with the conventional technique.

The present invention is made to overcome the above problems, and aims to provide an outdoor cooling unit for vehicular air conditioning apparatus that achieves sufficient noise reduction compared with the prior art.

Solution to Problem

An outdoor cooling unit for vehicular air conditioning apparatus according to the present invention includes a casing which includes an outlet section formed on a top surface and inlet sections formed on both sides of the outlet section with an inlet plane being inclined toward a base from the outlet section to the outside; a first heat exchanger disposed to face one of the inlet sections and a second heat exchanger disposed to face the other of the inlet sections; at least one propeller fan having a boss that rotates about an axis and a plurality of blades disposed on an outer periphery of the boss and disposed in the casing to face the outlet section; and a motor that rotate the propeller fan, the propeller fan being disposed to have the axis along a z axis and blow air in a positive direction of the z axis, when a normal line of the base of the casing is defined as the z axis and a direction from the base toward a top surface is defined as a positive direction of the z axis, and an angle formed between the normal line of the inlet plane and the z axis being an acute angle, wherein the propeller fan is configured such that a straight line which extends between a blade chord center point on an inner peripheral end of the blade and a blade chord center point on an outer peripheral end of the blade is inclined in the positive direction of the z axis toward an outer periphery of the blade, and a blade chord center line which is provided by connecting the blade chord center points from the inner peripheral end of the blade to the outer peripheral end of the blade forms a curve which is convex in the positive direction of the z axis across the entire area in the radius direction.

Advantageous Effects of Invention

According to the outdoor cooling unit for vehicular air conditioning apparatus of the present invention, the propeller fan is configured such that a straight line which extends between a blade chord center point on an inner peripheral end of the blade and a blade chord center point on an outer peripheral end of the blade is inclined in the positive direction of the z axis toward an outer periphery of the blade, and a blade chord center line which is provided by connecting the blade chord center points from the inner peripheral end of the blade to the outer peripheral end of the blade forms a curve which is convex in the positive direction of the z axis across the entire area in the radius direction. Accordingly, the outdoor cooling unit for vehicular air conditioning apparatus of the present invention can reduce flow resistance by reducing the amount of curving of air flow from the first heat exchanger and the second heat exchanger to the propeller fan, and can stabilizes blade edge vortex generated at the outer peripheral end of the blade, thereby achieving noise reduction.

DESCRIPTION OF EMBODIMENTS

Figure 1:
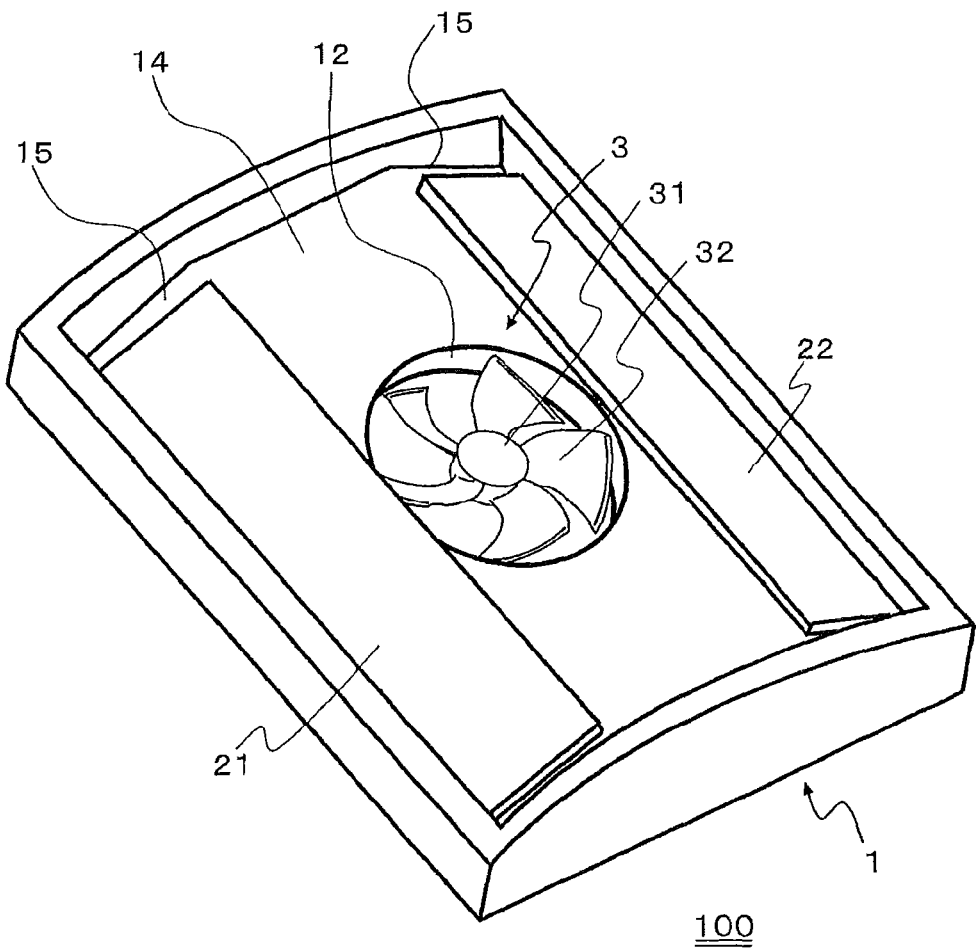
FIG. 1 is a perspective view of an outdoor cooling unit for vehicular air conditioning apparatus according to Embodiment 1 of the present invention.

With reference to the drawings, Embodiments of the present invention will be described below. For reference numerals, the same reference numerals denote the same or corresponding elements in FIGS. 1 to 12, which applies to the entire description herein. The size relationship between components in the figures may not be to scale. Further, the forms of components described herein are for illustration purposes only and the invention is not limited thereto. For example, although the following Embodiment is described as including a propeller fan having five blades, the number of blades are not specifically limited thereto.

Embodiment 1

Figure 2:
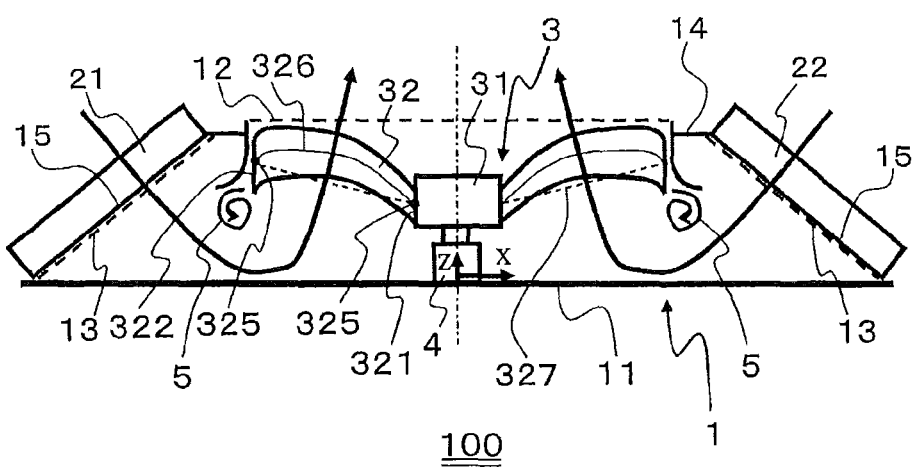
FIG. 2 is a vertical sectional view (vertical sectional view in the x axis direction) of the outdoor cooling unit for vehicular air conditioning apparatus according to Embodiment 1 of the present invention.
Figure 3:
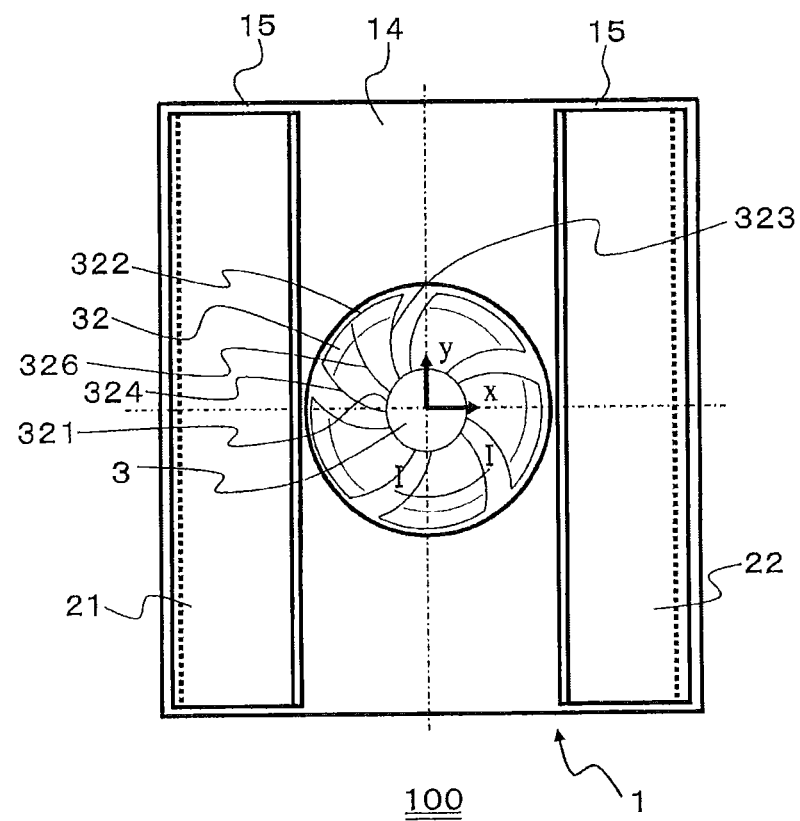
FIG. 3 is a plan view of the outdoor cooling unit for vehicular air conditioning apparatus according to Embodiment 1 of the present invention.

FIG. 1 is a perspective view of an outdoor cooling unit for vehicular air conditioning apparatus according to Embodiment 1 of the present invention. FIG. 2 is a vertical sectional view (vertical sectional view in the x axis direction) of the outdoor cooling unit for vehicular air conditioning apparatus. FIG. 3 is a plan view of the outdoor cooling unit for vehicular air conditioning apparatus. Further, FIG. 4 a sectional view taken along the line I-I of FIG. 3.

Referring to FIGS. 1 to 4, an outdoor cooling unit 100 for vehicular air conditioning apparatus according to Embodiment 1 will be described.

As shown in FIGS. 1 to 3, the outdoor cooling unit 100 for vehicular air conditioning apparatus includes a casing 1 in which an outlet section 12 and two inlet sections 13 are formed, heat exchangers disposed to face the respective inlet sections 13, a propeller fan 3 disposed in the casing 1 under the outlet section 12, and a motor 4 to rotate the propeller fan 3.

The casing 1 is formed in a substantially cuboid box shape. Further, an upper part of the casing 1 is made up of a top surface 14 parallel to a base 11 (bottom surface) of the casing 1 and inclined sections 15 which are formed on both sides of the top surface 14 so as to be inclined downward from the top surface 14 to the outside (inclined against the base 11 from the top surface 14 to the outside). The outlet section 12 is formed open to the top surface 14, while the inlet sections 13 are formed open to the inclined sections 15. That is, inlet planes of the inlet sections 13 (virtual plane that covers the opening of the inlet section 13) are each formed to be inclined downward from the outlet section 12 to the outside. For each of such inlet sections 13, a heat exchanger is disposed to face one of the inlet sections 13. In Embodiment 1, the heat exchanger disposed on the left side of FIG. 1 is referred to as a first heat exchanger 21, and the heat exchanger disposed on the right side of FIG. 1 is referred to as a second heat exchanger 22.

The propeller fan 3 includes a boss 31 that rotates about an axis and a plurality of blades 32 that are disposed on the outer periphery of the boss 31. The propeller fan 3 is disposed in the casing 1 under the outlet section 12 with the axis line extending in a normal line direction of the base 11. The propeller fan 3 is directly connected to a rotation shaft of the motor 4. A main body of the motor 4 is fixed to the base 11. That is, in Embodiment 1, the motor 4 rotates the propeller fan 3 while supporting the propeller fan 3. When the motor 4 is energized, the propeller fan 3 having such a configuration rotates so that air is blown out upward in the normal line direction of the base 11.

In describing the outdoor cooling unit 100, the z axis, x axis and y axis are defined as follows.

First, the normal line to the base 11 of the casing 1 is defined as the z axis, and a direction which extends upward from the base 11 (a direction toward the top surface 14) is defined as a positive direction of the z axis.

A direction in which the inlet sections 13 are juxtaposed in a plane which is vertical to the z axis is defined as the x axis.

A direction which is vertical to the x axis and the z axis is defined as the y axis.

When the z axis, x axis and y axis are defined as above, the propeller fan 3 is axially centered on the z axis and air is blown out in the positive direction of the z axis. Further, the inlet sections 13 are disposed within an area of z>0 and are juxtaposed in x axis direction.

In the outdoor cooling unit 100 having the above configuration, an angle between the z axis (that is, the axis of the propeller fan 3) and the normal line of the inlet plane of the inlet section 13 is an acute angle. Accordingly, as shown in FIG. 2, an air flow in the casing 1 from the first heat exchanger 21 and the second heat exchanger 22 (in other words, the inlet section 13) to the propeller fan 3 is substantially a V-shape. As a result, in the outdoor cooling unit 100 according to Embodiment 1, since a flow resistance of the air which flows in the casing 1 becomes large and a blade edge vortex generated at the outer periphery end of the blade becomes unstable, there may be a concern that noise increases.

However, the outdoor cooling unit 100 according to Embodiment 1 achieves noise reduction by providing the propeller fan 3 having the following configuration.

Figure 4:
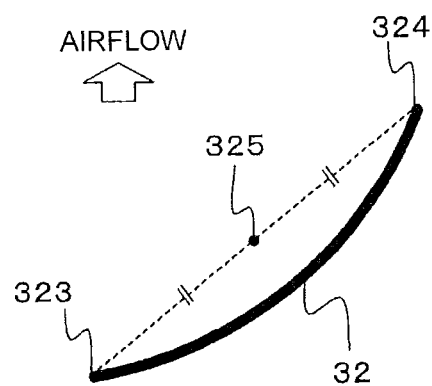
FIG. 4 is a sectional view taken along the line I-I of FIG. 3.

Specifically, the blades 32 of the propeller fan 3 are each formed such that a line segment 327 connecting between a blade chord center point 325 on an inner peripheral end 321 of the blade 32 and a blade chord center point 325 on an outer peripheral end 322 has an inclination determined by position in the positive direction of z axis determined proportional to closeness to the outer periphery of the casing. Further, the blades 32 of the propeller fan 3 are each formed such that a blade chord center line 326 which is provided by connecting the blade chord center points 325 from the inner peripheral end 321 to the outer peripheral end 322 forms a curve being convex in the positive direction of the z axis (downstream side of air flow) across the entire area in the radius direction of the propeller fan 3. As shown in FIG. 4, the blade chord center point 325 is a middle point of the straight line which extends between a leading edge 323 and a tailing edge 324 in a developed view of a cylindrical cross section of the blade 32 (for example, a cross section taken along the line I-I of FIG. 3).

An effect obtained by the above configuration will be described with reference to FIG. 2 and FIG. 12.

Figure 12:
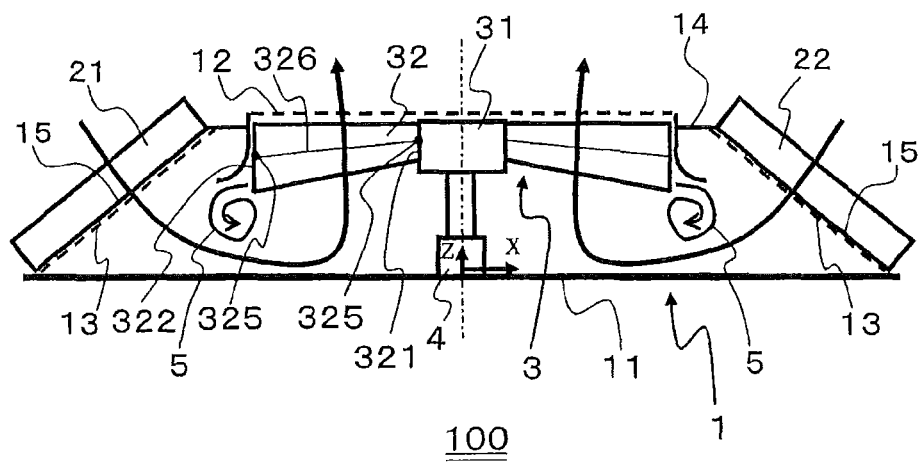
FIG. 12 is a vertical sectional view in the x axis direction of the conventional outdoor cooling unit for vehicular air conditioning apparatus.

FIG. 12 is a vertical sectional view in the x axis direction of the conventional outdoor cooling unit for vehicular air conditioning apparatus.

The conventional outdoor cooling unit shown in FIG. 12 differs from the outdoor cooling unit 100 according to Embodiment 1 only in a configuration of the propeller fan 3. Specifically, the blades 32 of the propeller fan 3 in the conventional outdoor cooling unit are each formed such that the straight line which extends between the blade chord center point 325 on the inner peripheral end 321 of the blade 32 and the blade chord center point 325 on the outer peripheral end 322 is inclined in the negative direction of the z axis (upstream side of air flow) toward the outer periphery. Further, the blades 32 of the propeller fan 3 in the conventional outdoor cooling unit are each formed such that the blade chord center line 326 connecting the blade chord center points 325 from the inner peripheral end 321 to the outer peripheral end 322 is inclined in the negative direction of the z axis (upstream side of air flow) across the entire area in the radius direction of the propeller fan 3.

In the propeller fan 3 of the conventional outdoor cooling unit having the above configuration, air which passes through the propeller fan 3 flows expanding toward the outer periphery of the propeller fan. Accordingly, in the conventional outdoor cooling unit, the amount of curving of air flow which flows in the casing 1 from the first heat exchanger 21 and the second heat exchanger 22 (in other words, the inlet section 13) to the propeller fan 3 increases, and a flow resistance of the air which flows in the casing 1 becomes large. Further, a blade edge vortex 5 generated at the outer peripheral end 322 of the blade 32 becomes unstable.

On the other hand, as shown in FIG. 2, in the outdoor cooling unit 100 according to Embodiment 1, air passing through the propeller fan 3 flows toward the axis of the propeller fan. Accordingly, in the outdoor cooling unit 100 according to Embodiment 1, the amount of curving of air flow which flows in the casing 1 from the first heat exchanger 21 and the second heat exchanger 22 (in other words, the inlet section 13) to the propeller fan 3 decreases, and a flow resistance of the air which flows in the casing 1 can be reduced. Further, in the outdoor cooling unit 100 according to Embodiment 1, the blade chord center line 326 of the blades 32 forms a curve which is convex in the positive direction of the z axis (downstream side of air flow) across the entire area in the radius direction of the propeller fan 3. Since a radius of curvature of the blade chord center line 326 becomes substantially the same as a radius of curvature of the contour of the vortex at the blade edge vortex 5, the blade edge vortex 5 can be smoothly released in the outer peripheral direction of the blades 32, thereby stabilizing the blade edge vortex 5. Accordingly, the outdoor cooling unit 100 for vehicular air conditioning apparatus according to Embodiment 1 can achieve noise reduction of the outdoor cooling unit compared with the conventional technique.

Furthermore, the smaller the angle between the z axis (that is, the axis of the propeller fan 3) and the normal line of the inlet plane of the inlet section 13, the larger the effect of noise reduction.

Figure 5:
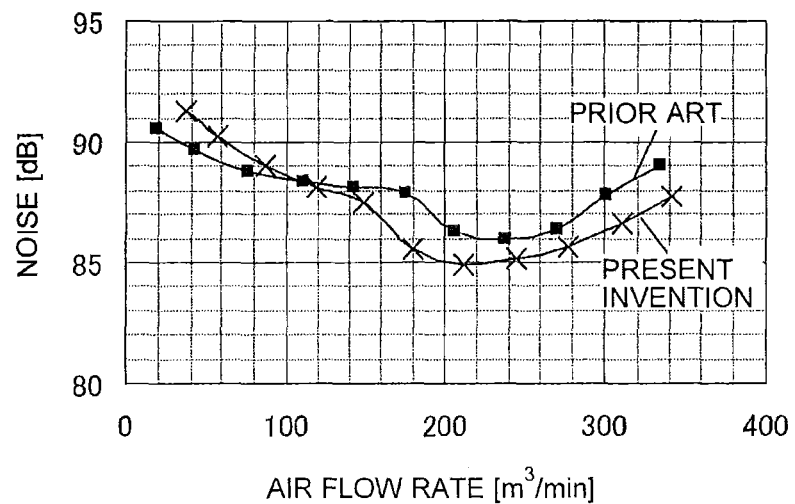
FIG. 5 is a chart which shows comparison of a relationship between the air volume and the noise of the outdoor cooling unit for vehicular air conditioning apparatus according to Embodiment 1 of the present invention and that of the conventional outdoor cooling unit for vehicular air conditioning apparatus.

FIG. 5 is a chart which shows comparison of a relationship between the air volume and the noise of the outdoor cooling unit for vehicular air conditioning apparatus according to Embodiment 1 of the present invention and that of the conventional outdoor cooling unit for vehicular air conditioning apparatus. Further, "present invention" shown in FIG. 5 is the data for the outdoor cooling unit 100 for vehicular air conditioning apparatus according to Embodiment 1, while "the prior art" shown in FIG. 5 is the data for the conventional outdoor cooling unit for vehicular air conditioning apparatus.

A necessary air flow rate of the outdoor cooling unit 100 for vehicular air conditioning apparatus according to Embodiment 1 is assumed to be 150 m$^3$/min or more. As seen from FIG. 5, the outdoor cooling unit 100 for vehicular air conditioning apparatus according to Embodiment 1 can achieve a sufficient noise reduction effect compared to the conventional outdoor cooling unit for vehicular air conditioning apparatus in the necessary air flow rate range.

Embodiment 2

In order to achieve a further noise reduction effect in the outdoor cooling unit 100 for vehicular air conditioning apparatus shown in Embodiment 1, the following configuration is desirable. Since the configuration described in Embodiment 1 is the same in Embodiment 2, only a configuration specific to Embodiment 2 will be described below.

Figure 6:
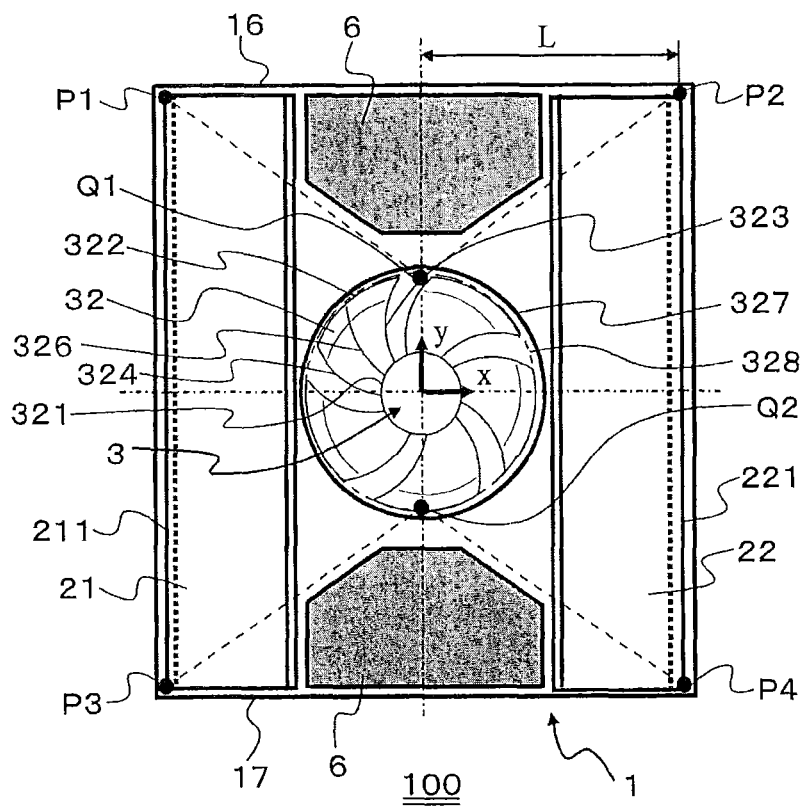
FIG. 6 is a plan view of the outdoor cooling unit for vehicular air conditioning apparatus according to Embodiment 2 of the present invention.

FIG. 6 is a plan view of the outdoor cooling unit for vehicular air conditioning apparatus according to Embodiment 2 of the present invention. In FIG. 6, the top surface 14 which is located above the non-ventilation area 6 is transparently shown.

As shown in FIG. 6, in the outdoor cooling unit 100 for vehicular air conditioning apparatus according to Embodiment 2, non-ventilation areas 6 are disposed on both sides of the propeller fan 3 in the y axis direction.

In describing detailed positions of the non-ventilation areas 6, positions of the first heat exchanger 21, the second heat exchanger 22 and the propeller fan 3 are defined as follows.

One of the side surfaces of the casing 1 opposed to each other in the y axis direction is defined as a first side surface 16.

The other of the side surfaces of the casing 1 opposed to each other in the y axis direction is defined as a second side surface 17.

An end of a y axis direction side edge 211 located on the first side surface 16, with the y axis direction side edge 211 being one of the y axis direction side edges which extend in the y axis direction of the first heat exchanger 21, located away from the propeller fan 3 (in Embodiment 2, a lower side edge), is defined as a P1 point.

An end of a y axis direction side edge 221 located on the first side surface 16, with the y axis direction side edge 221 being one of the y axis direction side edges which extend in the y axis direction of the second heat exchanger 22, located away from the propeller fan 3 (in Embodiment 2, a lower side edge), is defined as a P2 point.

An end of the y axis direction side edge 211 of the first heat exchanger 21 which is located on the second side surface 17 is defined as a P3 point.

An end of the y axis direction side edge 221 of the second heat exchanger 22 which is located on the second side surface 17 is defined as a P4 point.

In a plane which is vertical to the z axis, one of points, at which the y axis extending along the axis of the propeller fan 3 crosses an outer peripheral end rim 328 of the propeller fan 3, which is located facing the first side surface 16 is defined as a Q1 point.

In a plane which is vertical to the z axis, one of points, at which the y axis extending along the axis of the propeller fan 3 crosses an outer periphery of the propeller fan 3, which is located on the second side surface 17 is defined as a Q2 point.

Further, the outer peripheral end rim 328 of the propeller fan 3 is a circle which extends along the outer peripheral end 322 of the blades 32 of the propeller fan 3 (more specifically, the blade chord center point 325 of the outer peripheral end 322) about the axis of the propeller fan 3 in a plane which is vertical to the z axis.

When the first heat exchanger 21, the second heat exchanger 22 and the propeller fan 3 are each defined as described above, the non-ventilation areas 6 are disposed as an area surrounded by the P1 point, P2 point and Q1 point and an area surrounded by the P3 point, P4 point and Q2 point in a plane which is vertical to the z axis so as not to interfere with the first heat exchanger 21 and the second heat exchanger 22. A shape of the non-ventilation areas 6 in the plane vertical to the z axis is formed in a polygonal shape which is substantially symmetrical, for example, to the y axis and has a line segment taken in parallel to the x axis having a length which increases as away from the propeller fan 3 or remains the same.

An effect obtained by the above configuration will be described with reference to FIG. 7.

Figure 7:
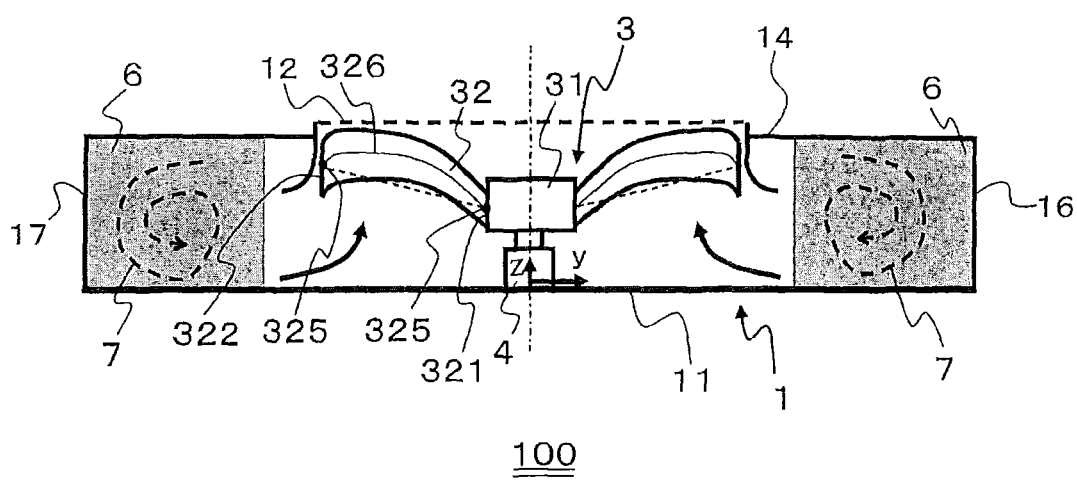
FIG. 7 is a vertical sectional view in the y axis direction of the outdoor cooling unit for vehicular air conditioning apparatus according to Embodiment 2 of the present invention.

FIG. 7 is a vertical sectional view in the y axis direction of the outdoor cooling unit for vehicular air conditioning apparatus according to Embodiment 2 of the present invention. FIG. 7 also shows a stagnation vortex 7 which is generated when the non-ventilation area 6 is not disposed, that is, in the outdoor cooling unit 100 described in Embodiment 1.

The outdoor cooling unit 100 according to Embodiment 2 also can reduce the amount of curving of air flow which flows in the casing 1 as described in Embodiment 1, and the blade edge vortex 5 can be stabilized. This is because the propeller fan 3 according to Embodiment 2 has the same configuration as that of Embodiment 1. That is, the blades 32 of the propeller fan 3 according to Embodiment 2 are also each formed such that the line segment 327 which extends between a blade chord center point 325 on an inner peripheral end 321 of the blade 32 and a blade chord center point 325 on an outer peripheral end 322 is inclined in the positive direction of the z axis (downstream side of air flow) toward the outer periphery. Further, the blades 32 of the propeller fan 3 according to Embodiment 2 are also each formed such that the blade chord center line 326 which is provided by connecting the blade chord center points 325 from the inner peripheral end 321 to the outer peripheral end 322 forms a curve which is convex in the positive direction of the z axis (downstream side of air flow) across the entire area in the radius direction of the propeller fan 3.

However, as shown in FIG. 7, the outdoor cooling unit 100 described in Embodiment 1 does not include the non-ventilation area 6. As a result, although an inlet port is not disposed on the first side surface 16 and the second side surface 17, suctioning of air from the side surface is facilitated and the stagnation vortex 7 is generated.

In Embodiment 2, the non-ventilation area 6 as described above is disposed in an area in which the stagnation vortex 7 is generated. Accordingly, since generation of stagnation vortex can be prevented in an area of the non-ventilation area 6, generation of the stagnation vortex 7 which becomes a source of noise can be prevented without disturbing suctioning of air from the first heat exchanger 21 and the second heat exchanger 22, thereby achieving further noise reduction.

In the conventional propeller fan 3, that is, in the propeller fan 3 in which the straight line which extends between the blade chord center point 325 on the inner peripheral end 321 of the blade 32 and the blade chord center point 325 on the outer peripheral end 322 is inclined in the negative direction of the z axis (upstream side of air flow) toward the outer periphery and the blade chord center line 326 which is provided by connecting the blade chord center points 325 from the inner peripheral end 321 to the outer peripheral end 322 is inclined in the negative direction of the z axis (upstream side of air flow) across the entire area in the radius direction of the propeller fan 3, an angle relative to the axis direction of the air flow on the upstream side of the propeller fan 3 is small. Accordingly, regardless of whether there is the non-ventilation area 6 or not, suctioning of air from the first side surface 16 and the second side surface 17 is not facilitated, and the stagnation vortex 7 is not generated from the beginning.

Figure 8:
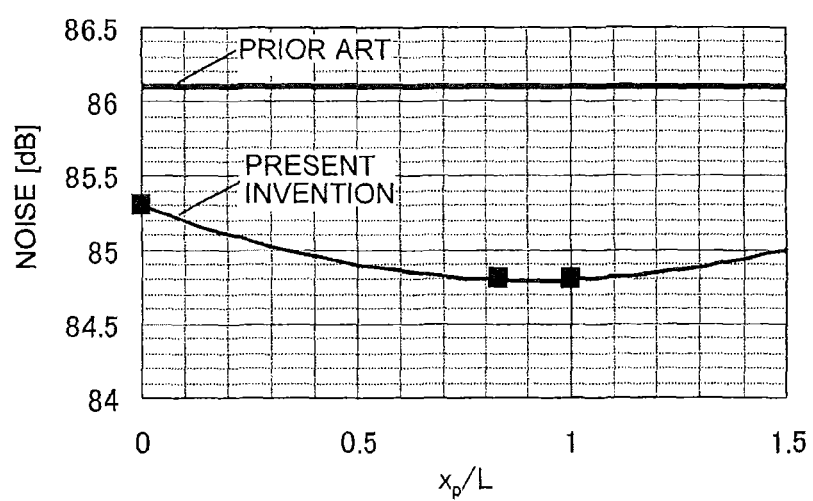
FIG. 8 is a chart which shows a relationship between the range of a non-ventilation area and the noise of the outdoor cooling unit for vehicular air conditioning apparatus according to Embodiment 2 of the present invention.

FIG. 8 is a chart which shows a relationship between the range of a non-ventilation area and the noise of the outdoor cooling unit for vehicular air conditioning apparatus according to Embodiment 2 of the present invention.

Further, "the invention" shown in FIG. 8 is the data for the outdoor cooling unit 100 for vehicular air conditioning apparatus according to Embodiment 2, while "the conventional technique" shown in FIG. 8 is the data for the conventional outdoor cooling unit for vehicular air conditioning apparatus. FIG. 8 compares the outdoor cooling unit 100 for vehicular air conditioning apparatus according to Embodiment 2 and the conventional outdoor cooling unit for vehicular air conditioning apparatus when the air flow rate is 250 m$^3$/min. Further, as shown in FIG. 6, L is a distance in the x axis direction between the y axis and the y axis direction side edge 221 of the second heat exchanger 22 (or the y axis direction side edge 211 of the first heat exchanger 21). Further, xp is a distance in the x axis direction between the y axis and the P2 point, the P4 point (in FIG. 6, xp=L) when the P2 point, the P4 point (or the P1 point, the P3 point) are displaced in the x axis direction.

As seen from FIG. 8, compared with the case of xp/L=0, that is, when the non-ventilation area 6 is not disposed, the case of xp/L>0, that is, when the non-ventilation area 6 is provided, further noise reduction effect can be achieved. Further, it is revealed that the noise reduction effect is the largest particularly around xp/L=1.

In Embodiment 2, a shape of the non-ventilation area 6 in a plane vertical to the z axis is formed in a polygonal shape which is substantially symmetrical, for example, to the y axis and has a line segment taken in parallel to the x axis having a length which increases as away from the propeller fan 3 or remains the same. The invention is not limited thereto, and the shape of the non-ventilation area 6 may be, for example, as described below as long as being disposed in an area surrounded by the P1 point, P2 point and Q1 point and an area surrounded by the P3 point, P4 point and a Q2 point without interfering with the first heat exchanger 21 and the second heat exchanger 22.

Figure 9:
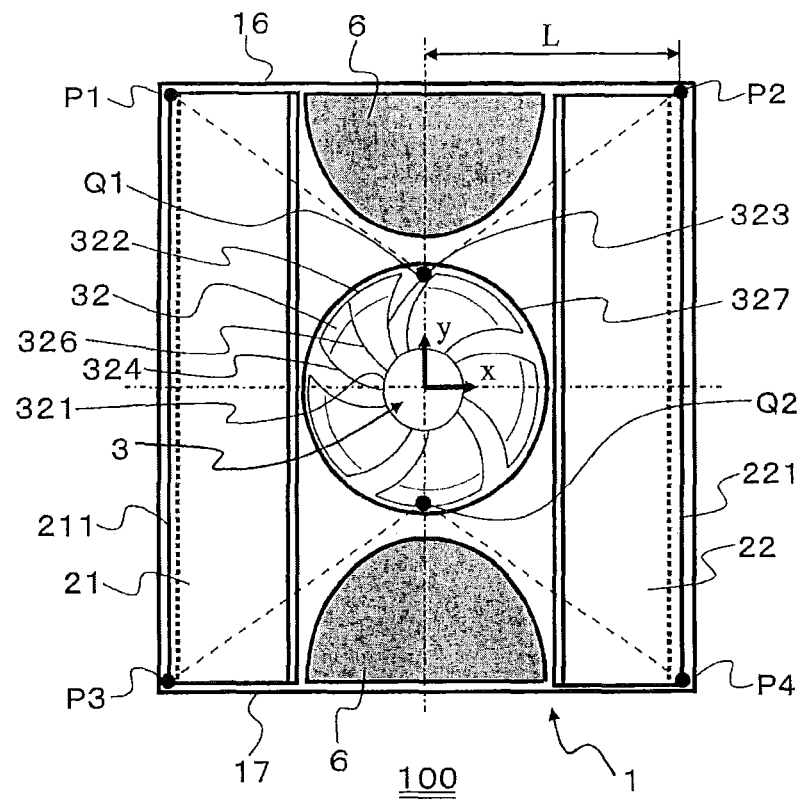
FIG. 9 is a plan view which shows another example of the outdoor cooling unit for vehicular air conditioning apparatus according to Embodiment 2 of the present invention.

FIG. 9 is a plan view which shows another example of the outdoor cooling unit for vehicular air conditioning apparatus according to Embodiment 2 of the present invention. In FIG. 9, the top surface 14 which is located above the non-ventilation area 6 is transparently shown.

As shown in FIG. 9, a shape of the non-ventilation areas 6 in the plane vertical to the z axis may be formed in a curved shape which is substantially symmetrical to the y axis and has a line segment taken in parallel to the x axis having a length which increases as away from the propeller fan 3 or remains the same. With the non-ventilation area 6 having such a configuration, the same noise reduction effect can be achieved.

Further, the shape of the non-ventilation area 6 is not limited to that is shown in FIG. 6 and FIG. 9. The non-ventilation area 6 may be formed asymmetric to the y axis, or part of the side surface of the non-ventilation area 6 may be recessed. That is, the shape of the non-ventilation area 6 is not limited as long as being disposed in an area surrounded by the P1 point, the P2 point and the Q1 point and an area surrounded by the P3 point, the P4 point and the Q2 point without interfering with the first heat exchanger 21 and the second heat exchanger 22, and further noise reduction effect of the outdoor cooling unit 100 for vehicular air conditioning apparatus described in Embodiment 1 can be achieved. However, depending on the shape of the non-ventilation area 6, compared with the non-ventilation area 6 shown in FIG. 6 and FIG. 9, a flow resistance may increase in the air flow from the first heat exchanger 21 and the second heat exchanger 22 to the propeller fan 3. Accordingly, when the non-ventilation area 6 is disposed in the casing 1, it is further desirable to form the non-ventilation area 6 in the shape shown in FIG. 6 and FIG. 9.

Further, although the non-ventilation areas 6 are disposed on both sides of the propeller fan 3 in the y axis direction in Embodiment 2, the non-ventilation area 6 may be formed on one side of the propeller fan 3 in the y axis direction. Since the stagnation vortex 7 can be prevented from being generated in an area in which the non-ventilation area 6 is disposed, noise reduction effect of the outdoor cooling unit 100 for vehicular air conditioning apparatus of Embodiment 1 can be achieved.

Further, although an inside the non-ventilation area 6 is not specifically described in Embodiment 2, the inside of the non-ventilation area 6 may be formed to be hollow so that the first heat exchanger 21 and the second heat exchanger 22 as well as components of a refrigeration cycle (such as a compressor, an expansion valve and a pipe) may be housed in the non-ventilation area 6. That is, the inside of the non-ventilation area 6 may be uses as a machine chamber. Using the inside of the non-ventilation area 6 as a machine chamber can eliminate a need of providing a separate machine chamber, thereby reducing the size of the outdoor cooling unit 100 for vehicular air conditioning apparatus.

Embodiment 3

When the non-ventilation area 6 is disposed only on one side of the propeller fan 3 in the y axis direction, further noise reduction can be achieved by using the following configuration. Further, a configuration which is not specifically described in Embodiment 3 is the same as that of Embodiment 1 or Embodiment 2.

Figure 10:
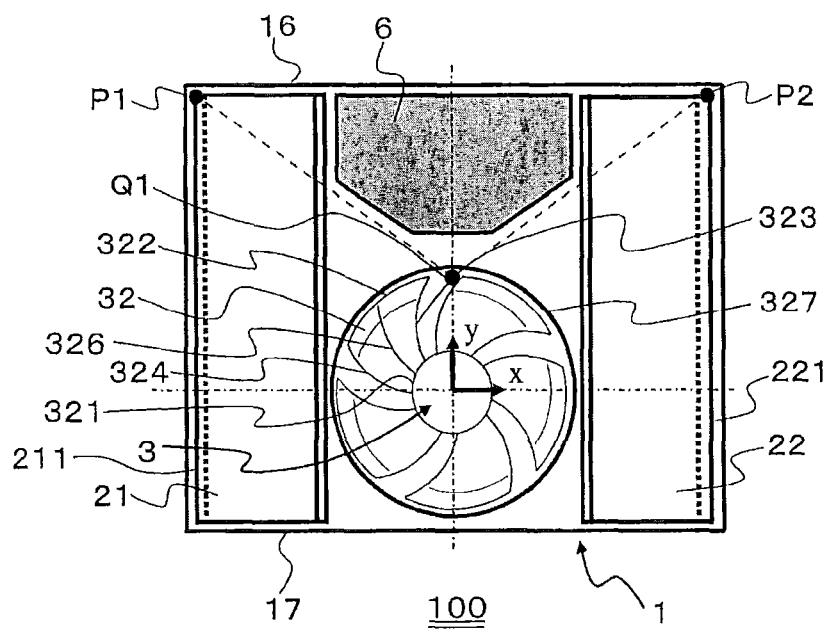
FIG. 10 is a plan view of the outdoor cooling unit for vehicular air conditioning apparatus according to Embodiment 3 of the present invention.

FIG. 10 is a plan view of the outdoor cooling unit for vehicular air conditioning apparatus according to Embodiment 3 of the present invention. In FIG. 10, the top surface 14 which is located above the non-ventilation area 6 is transparently shown.

As shown in FIG. 10, in the outdoor cooling unit 100 according to Embodiment 3, the propeller fan 3 is disposed on one side of the casing 1 in the y axis direction (on the side close to the second side surface 17). Further, the non-ventilation area 6 is disposed only on the other side of the casing 1 which is opposite to the propeller fan 3 in the y axis direction (on the side close to first side surface 16). The inside of the non-ventilation area 6 is used as a machine chamber.

With the above configuration, for the second side surface 17 on which the non-ventilation area 6 is not disposed, the stagnation vortex 7 can be prevented from being generated since the propeller fan 3 is disposed only on the side close to the second side surface 17. Further, for the first side surface 16 on which the non-ventilation area 6 is disposed, the stagnation vortex 7 can be prevented from being generated since the non-ventilation area 6 is disposed. As a result, when the non-ventilation area 6 is disposed only on one side of the propeller fan 3 in the y axis direction, further noise reduction can be achieved by using the configuration of the outdoor cooling unit 100 according to Embodiment 3.

Further, in Embodiment 3, using the non-ventilation area 6 as a machine chamber can eliminate a need of providing a separate machine chamber, thereby reducing the size of the outdoor cooling unit 100 for vehicular air conditioning apparatus.

Embodiment 4

In Embodiments 1 to 3, one propeller fan 3 is disposed for each outdoor cooling unit 100. When a plurality of propeller fans 3 are disposed for each outdoor cooling unit 100, further noise reduction of the outdoor cooling unit described in Embodiments 1 to 3 can be achieved. Further, a configuration which is not specifically described in Embodiment 4 is the same as that of Embodiments 1 to 3. In the following description, an example of providing a plurality of propeller fans 3 in the outdoor cooling unit 100 shown in Embodiment 2 will be described.

Figure 11:
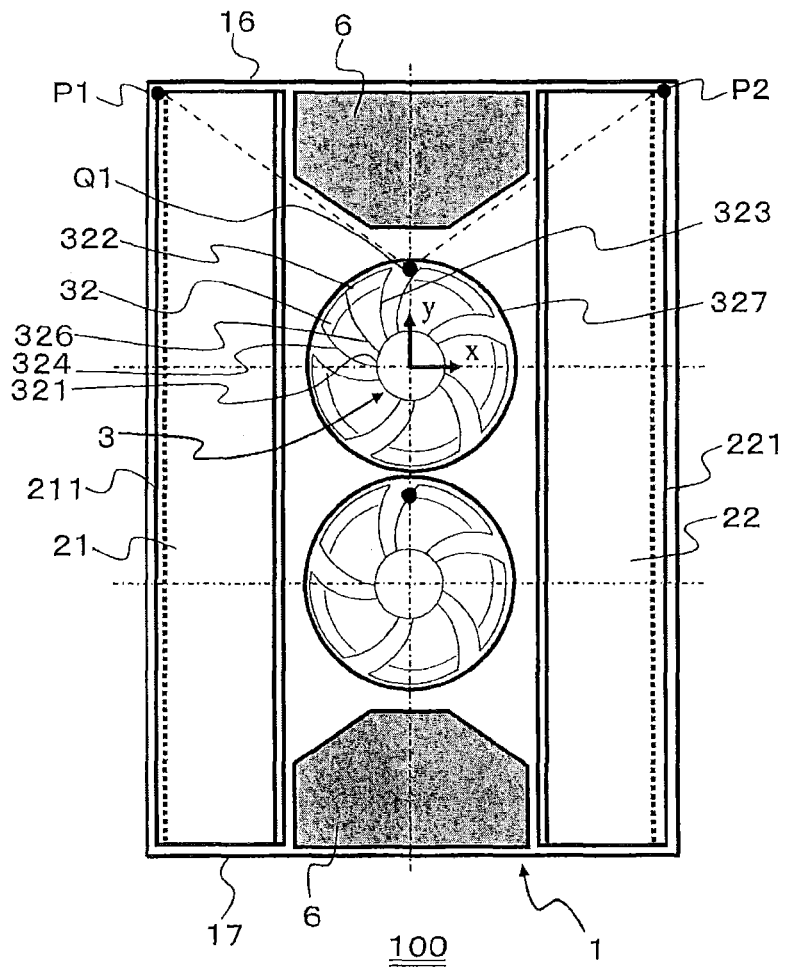
FIG. 11 is a plan view of the outdoor cooling unit for vehicular air conditioning apparatus according to Embodiment 4 of the present invention.

FIG. 11 is a plan view of the outdoor cooling unit for vehicular air conditioning apparatus according to Embodiment 4 of the present invention. In FIG. 11, the top surface 14 which is located above the non-ventilation area 6 is transparently shown.

As shown in FIG. 11, the outdoor cooling unit 100 for vehicular air conditioning apparatus according to Embodiment 4 includes a plurality of propeller fans 3 are arranged in the y axis direction.

With the above configuration, flow resistance is reduced by reducing uneven air flow distribution which passes through the first heat exchanger 21 and the second heat exchanger 22, thereby achieving further noise reduction.

Embodiments 1 to 4 are described the outdoor cooling unit 100 for vehicular air conditioning apparatus in which the propeller fan 3 blows air in the upward direction. That is, Embodiments 1 to 3 described the outdoor cooling unit 100 for vehicular air conditioning apparatus mounted on a ceiling of the vehicle. However, the outdoor cooling unit 100 for vehicular air conditioning apparatus according to the present invention is not limited to the outdoor cooling unit for vehicular air conditioning apparatus in which the propeller fan 3 blows air in the upward direction. For example, the outdoor cooling unit 100 for vehicular air conditioning apparatus described in Embodiments 1 to 3 may be configured to be mounted on the side surface or on the bottom of the vehicle and the propeller fan 3 blows air in a lateral direction or a downward direction.

REFERENCE SIGNS LIST 100 outdoor cooling unit 1 casing 11 base 12 outlet section 13 inlet section 14 top surface 15 inclined section 16 first side surface 17 second side surface first heat exchanger 211 y axis direction side edge 22 second heat exchanger 221 y axis direction side edge 3 propeller fan 31 boss 32 blade 321 inner peripheral end 322 outer peripheral end 323 leading edge 324 trailing edge 325 blade chord center point 326 blade chord center line 327 straight line 328 outer peripheral end rim 4 motor blade edge vortex 6 non-ventilation area 7 stagnation vortex

The invention claimed is:

1. An outdoor cooling unit for a vehicular air conditioning apparatus comprising:
a casing including an outlet section, inlet sections and a base, the outlet section formed on a top surface of the casing, the inlet sections each being formed on one of both sides of the outlet section to have an inlet plane inclined against the base by having a distance to the base decreasing in a direction from the outlet section to outside;
a first heat exchanger disposed to face one of the inlet sections and a second heat exchanger disposed to face an other of the inlet sections, the first heat exchanger being separated from the second heat exchanger along an x axis;
at least one propeller fan having a boss to rotate about an axis of the propeller fan and a plurality of blades disposed on an outer periphery of the boss and disposed in the casing to face the outlet section; and
a motor to rotate the propeller fan, wherein
where a normal line to the base of the casing is defined as a z axis and a direction from the base toward the top surface is defined as a positive direction of the z axis,
the propeller fan is disposed to have the axis along the z axis and blow air in a positive direction of the z axis,
an angle formed between the normal line to the inlet plane and the z axis is an acute angle,
each of the blades is defined by a blade chord center point on an inner peripheral end thereof and an other blade chord center point on an outer peripheral end thereof, positioned so that a line segment connecting therebetween has an inclination determined by position in the positive direction of z axis determined proportional to closeness to outer periphery of the blade,
a blade chord center line connecting the blade chord center points from the inner peripheral end of the blade to the outer peripheral end of the blade forms a curve being convex in the positive direction of the z axis across the entire area in a radius direction,
at least one non-ventilation area is disposed within the casing in at least one of a first area arranged at one side of the at least one propeller fan in a y axis that is perpendicular to the x axis and the z axis, and a second area arranged at an other side of the at least one propeller fan in the y axis, so as not to interfere with the first heat exchanger and the second heat exchanger and so as to prevent air flow in an area in which the non-ventilation area is provided.

2. An outdoor cooling unit for a vehicular air conditioning apparatus comprising:
a casing including an outlet section, inlet sections and a base, the outlet section formed on a top surface of the casing, the inlet sections each being formed on one of both sides of the outlet section to have an inlet plane inclined against the base by having a distance to the base decreasing in a direction from the outlet section to outside;
a first heat exchanger disposed to face one of the inlet sections and a second heat exchanger disposed to face an other of the inlet sections;
at least one propeller fan having a boss to rotate about an axis of the propeller fan and a plurality of blades disposed on an outer periphery of the boss and disposed in the casing to face the outlet section; and a motor to rotate the propeller fan, wherein
where a normal line to the base of the casing is defined as a z axis and a direction from the base toward the top surface is defined as a positive direction of the z axis,
the propeller fan is disposed to have the axis along the z axis and blow air in a positive direction of the z axis,
an angle formed between the normal line to the inlet plane and the z axis is an acute angle,
each of the blades is defined by a blade chord center point on an inner peripheral end thereof and an other blade chord center point on an outer peripheral end thereof, positioned so that a line segment connecting therebetween has an inclination determined by position in the positive direction of z axis determined proportional to closeness to outer periphery of the blade, and
a blade chord center line connecting the blade chord center points from the inner peripheral end of the blade to the outer peripheral end of the blade forms a curve being convex in the positive direction of the z axis across the entire area in a radius direction,
when a direction in which the inlet sections are juxtaposed in a plane, the plane being vertical to the z axis, is defined as an x axis,
a direction vertical to the x axis and the z axis is defined as a y axis,
one of side surfaces of the casing opposed to each other in the y axis direction is defined as a first side surface,
an other of side surfaces of the casing opposed to each other in the y axis direction is defined as a second side surface,
an end of a y axis direction side edge located closer to the first side surface than an other end is defined as a P1 point, the y axis direction side edge being one of the y axis direction side edges extending in the y axis direction of the first heat exchanger, the y axis direction side edge located more away from the propeller fan than an other of the y axis direction side edges of the first heat exchanger,
an end of a y axis direction side edge located closer to the first side surface than an other end is defined as a P2 point, the y axis direction side edge being one of the y axis direction side edges extending in the y axis direction of the second heat exchanger, the y axis direction side edge located more away from the propeller fan than an other of the y axis direction side edges of the second heat exchanger,
an end of the y axis direction side edge located closer to the second side surface than the end is defined as a P3 point, they axis direction side edge being one of they axis direction side edges extending in the y axis direction of the first heat exchanger, the y axis direction side edge located more away from the propeller fan than the other of the y axis direction side edges of the first heat exchanger,
an end of the y axis direction side edge located closer to the second side surface than the other end is defined as a P4 point, the y axis direction side edge being one of the y axis direction side edges extending in the y axis direction of the second heat exchanger, the y axis direction side edge located more away from the propeller fan than the other of the y axis direction side edges of the second heat exchanger, one of points, in a plane vertical to the z axis, at which the y axis passing through the axis of the propeller fan adjacent to the first side surface crosses an outer peripheral end rim of the propeller fan, the point being located facing the first side surface, is defined as a Q1 point, and
one of points, in a plane vertical to the z axis, at which the y axis passing through the axis of the propeller fan adjacent to the second side surface crosses an outer peripheral end rim of the propeller fan, the point being located facing the second side surface is defined as a Q2 point,
a non-ventilation areas is disposed in at least one of an area surrounded by the P1 point, P2 point and Q1 point and an area surrounded by the P3 point, P4 point and Q2 point so as not to interfere with the first heat exchanger and the second heat exchanger and so as to prevent generation of stagnation vortex in an area in which the non-ventilation area is provided.

3. The outdoor cooling unit of claim 2, wherein, in the plane vertical to the z axis, the non-ventilation area is formed in a shape having a line segment, the line segment taken in parallel to the x axis and having a length increasing with distance from the propeller fan or a constant length.

4. The outdoor cooling unit of claim 2, wherein the non-ventilation area has a hollow inside provided as a machine chamber that houses components of a refrigeration cycle.

5. The outdoor cooling unit of claim 4, wherein the propeller fan is disposed closer to one of the first side surface and the second side surface than other, and
the non-ventilation area is disposed closer to the other of the first side surface and the second side surface than other.

6. The outdoor cooling unit of claim 1, wherein the at least one propeller fan includes a plurality of propeller fans, and the propeller fans are arranged in a direction vertical to the direction in which the inlet sections are juxtaposed in a plane vertical to the z axis.

7. The outdoor cooling unit of claim 1, wherein, in the plane vertical to the z axis, the at least one non-ventilation area is formed in a shape having a line segment, the line segment taken in parallel to the x axis and having a length increasing with distance from the propeller fan or a constant length.

8. The outdoor cooling unit of claim 1, wherein the non-ventilation area has a hollow inside.

9. The outdoor cooling unit of claim 8, wherein the hollow inside of the non-ventilation area is provided as a machine chamber that may house components of a refrigeration cycle.

10. The outdoor cooling unit of claim 1, wherein the propeller fan is disposed closer to one of the first side surface and the second side surface than other, and the at least one non-ventilation area is disposed closer to the other of the first side surface and the second side surface than other.

11. The outdoor cooling unit of claim 1, wherein the at least one propeller fan includes a plurality of propeller fans, and the propeller fans are arranged in a direction vertical to the direction in which the inlet sections are juxtaposed in a plane vertical to the z axis.

* * * * *